R. EASTWOOD.
AUTOMOBILE AND LIKE VEHICLE.
APPLICATION FILED AUG. 11, 1919.
1,331,745.
Patented Feb. 24, 1920.
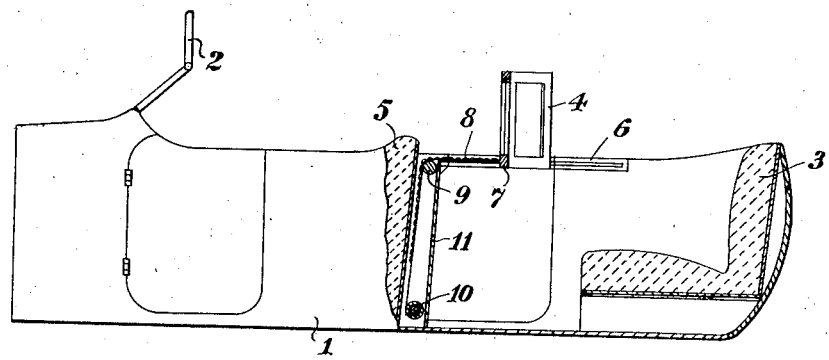
Inventor
Rawdon Eastwood,
By
Sturtevant & Mason,
Attorneys

UNITED STATES PATENT OFFICE.

RAWDON EASTWOOD, OF LISCARD, ENGLAND.

AUTOMOBILE AND LIKE VEHICLE.

1,331,745.   Specification of Letters Patent.   Patented Feb. 24, 1920.

Application filed August 11, 1919.   Serial No. 316,912.

*To all whom it may concern:*

Be it known that I, RAWDON EASTWOOD, a subject of the King of Great Britain, residing at Liscard, in the county of Chester and Kingdom of England, have invented certain new and useful Improvements in Automobile and like Vehicles, of which the following is a specification.

The present invention relates to improvements in automobile vehicles and the like and more particularly to means for protecting from wind and draft the occupants of the rear seats of vehicles.

According to the present invention a wind screen of any known or usual form is mounted to slide on guides usually horizontal and is connected to a flexible covering and normally is incased within a partition in front of the said seats.

The present invention is more particularly described with reference to the accompanying drawing.

The body of an automobile vehicle is shown at 1. This may have the usual wind screen 2 for the front seat. The back seat 3 of such a vehicle have in certain cases been provided with a folding wind screen but in such a case drafts are apt to enter the space in front of these seats. By the present invention a wind screen 4 for the back seats which can be collapsed against the back 5 of the front seats or pulled out into suitable position near to the back seats 3, is mounted in any desired manner to attain this object for instance by being carried on slotted guide rails 6. The lower front edge 7 is attached to a lattice covering 8 which either may be of any flexible material passing over a guide 9 and adapted to be mounted on spring roller 10 or the like. This lattice 8 or flexible blind is concealed within a casing or box 11 when out of use. It will be seen therefore that in use the space between the wind screen 4 and the back 5 of the front seats of the car will be covered over thereby providing a covering similar to that virtually given by the hollow dash board of the car for the front seats.

The device consisting of the sliding flexible blind or lattice may be used to be adjusted if desired within the wind screen 4.

If desired the horizontal guide 6 for the wind screen may be arranged to fold or hinge parallel with this when in the collapsed position.

I declare that what I claim is:—

A wind shield for automobile vehicles comprising a box fitting behind the front seats of the vehicle and having an open top, guides arranged horizontally on the sides of the vehicle, a wind screen mounted in said guides, a flexible sheet normally stored in said box and attached to said wind-screen to follow it when it is drawn along said guides and spring means to tension said flexible sheet so that in the collapsed position it is withdrawn out of sight and in the extended position it incloses a rectangular space.

In witness whereof, I have hereunto signed my name this 4th day of July 1919, in the presence of two subscribing witnesses.

RAWDON EASTWOOD.

Witnesses:
J. MCLACHLAN,
F. G. WILLIAMS.